Nov. 4, 1930.                C. F. PROOS                1,780,686
             JUNCTION BOX FOR HIGH TENSION ELECTRIC CABLES
                        Filed Jan. 16, 1928
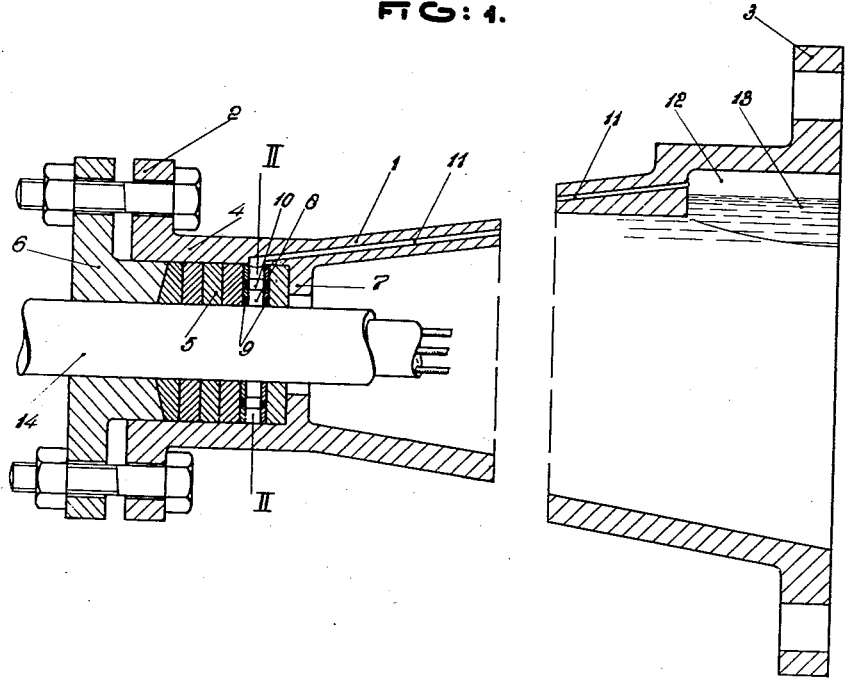
FIG: 1.
FIG: 2.
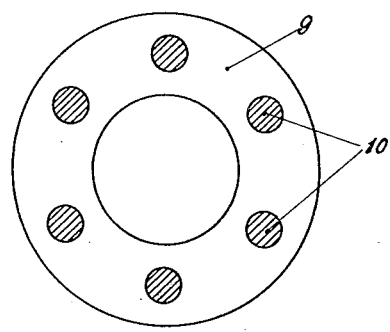
C. F. Proos
  INVENTOR Patented Nov. 4, 1930

1,780,686

UNITED STATES PATENT OFFICE

CORNELIS FREDERIK PROOS, OF DELFT, NETHERLANDS, ASSIGNOR TO NAAMLOOZE VENOOTSCHAP NEDERLANDSCHE KABELFABRIEK, OF DELFT, NETHERLANDS, A DUTCH COMPANY

JUNCTION BOX FOR HIGH-TENSION ELECTRIC CABLES

Application filed January 16, 1928, Serial No. 247,244 and in the Netherlands February 7, 1927.

Junction boxes for high-tension electric cables are usually provided with expansion chambers situated above the level of the oil or compound, which chambers, as a rule, are filled with air, although sometimes with other gases, the provision of these expansion chambers permitting expansion of the oil or compound with which the junction boxes are filled. When the cable becomes heated, the pressure of this imprisoned air rises, and the interior of the junction box will accordingly be exposed to increased pressure, against which the joints of the box and the packing against the lead sheathing should be sufficiently tight. A joint with the lead sheathing can be effected by soldering; but it is also feasible to employ a stuffing box, with which a tight joint may be made by means of the pressure of the packing material. A stuffing box may also be employed in conjunction with one or more soldered joints.

The present invention has for its object a special form of stuffing box whereby a tight joint may be made against the lead sheathing. To this end, and according to the present invention, there is or are formed, between the separate packing rings, one or more intermediate spaces which are in communication with one or more expansion spaces in the junction box.

This communication may be established by means of one or more passages formed in the walls of the junction box. Moreover, according to the invention, the intermediate space or spaces between the packing rings may be formed by two or more parallel rings which are held apart by interposed distance pieces.

A typical embodiment of the invention is illustrated by the accompanying drawings, wherein Figure 1 is a partial longitudinal section through a junction box and Figure 2 is a cross section, on a larger scale, on the line II—II, of Figure 1 of a member by which the intermediate space between the packing rings is formed.

1 is the wall of the junction box having terminal and middle flanges 2 and 3. That portion 4, of the box wall which is adjacent to the terminal flange 2 is cylindrical in shape, and forms a stuffing box in which packing rings 5, of suitable packing material, are compressed by means of a gland 6. 7 is a rim at the inner end of the stuffing box, to take up the pressure exerted by the gland 6 on the packing rings 5. In addition to the packing rings 5, the interior of the stuffing box encloses a space which, under normal conditions, is full of air. This space 8, which is formed by a member consisting of two rings 9, connected together by equiangularly disposed distance pieces 10, communicates with a passage 11 in the wall of the junction box 1, the opposite end of said passage opening into the expansion chamber 12 of the junction box, said chamber being situated above the level 13 of the oil or compound. 14 is the lead sheathing of the cable.

The pressure in the space 8 will always be the same as that in the expansion chamber 12, and when an increase of pressure in the expansion chamber 12 tends to force oil out of the junction box, the escape of oil will be prevented by the corresponding increase of pressure in the space 8 of the stuffing box. The air spaces in the stuffing box can be easily shut off from the oil space in the junction box by means of an ordinary packing because the pressure difference is extremely small, and amounts to no more than that corresponding with the height of the column of liquid in the junction box itself.

Consequently, the risk of oil escaping out of the junction box along the sheath of the cable, when a rise in pressure occurs, is not increased.

At the same time, however, any air which is imprisoned in the stuffing box and which may strive to escape in the course of time, cannot constitute any danger. Such air will escape from the air space chamber of the stuffing box towards the expansion chamber; and in no case will there be any tendency for this air to become distributed in the insulating material in the interior of the junction box.

What I claim is:

1. A junction box for high tension electric cables provided with lead sheathing, said box having an expansion chamber therein, a plurality of packing rings disposed around the lead sheathing of the cable, spaced separating means arranged between said packing rings forming space between the adjacent faces of the packing rings, and means communicating the space between said means with the expansion chamber.

2. A junction box for high tension electric cables having an expansion chamber therein, a plurality of packings rings disposed around the lead sheathing of the cable, spaced separating means between the packing rings, and means affording communication between said means and the expansion chamber.

3. A junction box for high tension electric cables comprising a casing having a liquid expansion chamber therein, a pair of spacedly arranged annular separating members disposed around the cable, packing rings disposed around the cable and adjacent the outer faces of the separating members, means for compressing said packing rings, and means communicating the space between the spacedly disposed members with the liquid expansion chamber.

4. A junction box for high tension electric cables, provided with lead sheathing, said box having an expansion chamber, a pair of spaced annular separating members disposed around the sheathing, packing rings disposed around said sheathing and adjacent the outer faces of said members, and means affording communication between the spaces between the members and the expansion chamber.

5. A junction box for high tension electric cables, provided with lead sheathing, said box having an expansion chamber therein, a pair of spacedly disposed annular separating members disposed around the sheathing, a plurality of packing rings disposed around the sheathing and adjacent the outer faces of said members, and means in the wall of the junction box affording communication between the space between said members and the expansion chamber.

In testimony whereof, I affix my signature.

CORNELIS FREDERIK PROOS.